US007801499B2

(12) United States Patent
Wright et al.

(10) Patent No.: US 7,801,499 B2
(45) Date of Patent: Sep. 21, 2010

(54) SYSTEM AND METHOD FOR FILTERING PROGRAM SERVICE NAME DATA

(75) Inventors: David Paul Wright, Garden City, MI (US); Manuel Alejandro Báez Torres, Westland, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 617 days.

(21) Appl. No.: 11/739,266

(22) Filed: Apr. 24, 2007

(65) Prior Publication Data

US 2008/0268801 A1 Oct. 30, 2008

(51) Int. Cl.
*H04H 40/00* (2008.01)
*H04B 1/18* (2006.01)
*H04M 1/00* (2006.01)

(52) U.S. Cl. .................. 455/130; 455/3.06; 455/152.1; 455/154.2; 455/566

(58) Field of Classification Search ....... 455/3.01–3.06, 455/152.1, 154.1–154.2, 184.1–186.1, 345, 455/566
See application file for complete search history.

(56) References Cited

U.S. PATENT DOCUMENTS 5,475,874 A * 12/1995 Klos ...................... 455/161.2
6,470,178 B1 * 10/2002 Cummings-Hill et al. ...................... 455/186.1
6,581,207 B1 * 6/2003 Sumita et al. ................. 725/46
RE38,600 E * 9/2004 Mankovitz .................. 348/473
6,980,769 B2 * 12/2005 Toporski .................... 455/3.01
7,519,704 B2 * 4/2009 Ehrich et al. ................ 709/224
7,565,104 B1 * 7/2009 Brown et al. ............... 455/3.01
2007/0101352 A1 * 5/2007 Rabina et al. .................. 725/1
2007/0141980 A1 * 6/2007 Lee et al. .................. 455/3.06

FOREIGN PATENT DOCUMENTS

DE 198 13 678 10/1999

OTHER PUBLICATIONS

Foreign communication first citing a listed reference (dated Mar. 3, 2010).

* cited by examiner

*Primary Examiner*—Simon D Nguyen
(74) *Attorney, Agent, or Firm*—Brinks Hofer Gilson & Lione

(57) ABSTRACT

A system and method for filtering Program Service Name (“PSN”) data includes a processor, an antenna in communication with the processor, a display device in communication with the processor, and a memory unit in communication with the processor. The memory unit contains instruction executable by the processor to configure the processor to receive a signal from a wireless source via the antenna, the signal having PSN data, determine if the PSN data is a static PSN or a slowly updated PSN, and display the PSN data on the display device if the PSN data is a static PSN or a slowly updated PSN.

24 Claims, 2 Drawing Sheets

SYSTEM AND METHOD FOR FILTERING PROGRAM SERVICE NAME DATA

BACKGROUND

1. Field of the Invention

The present invention generally relates to systems and methods for filtering program service name ("PSN") data.

2. Description of the Known Technology

Radio stations, such as FM radio stations, are capable of transmitting sub-carrier data. One type of sub-carrier data commonly transmitted by FM stations is PSN data. PSN data is sent in eight character blocks. FM stations generally use PSN data to transmit station identification information. For example, a radio station may transmit in PSN data identifiers such as "94.7 WCSX", "101 WRIF", and "89X". Radio receivers such as those commonly found in automobiles, will receive PSN data from these FM stations and will display this data on a display device. By so doing, the user of the radio receiver will be more likely to recognize the radio station name.

Generally, PSN data transmitted by radio stations is static or is slowly updated. For example, a radio station may usually transmit "94.7 WCSX" as PSN data. However, when a public service announcement is being broadcasted, the radio station may transmit "PSA" to indicate that a public service announcement is being broadcasted. However, some FM stations update the transmitted PSN data in very fast time intervals, about one second. This updated PSN data may contain additional information such as artist, song title, and/or album name. Like before, this information is received by the radio receiver, displayed on the display device and is visible by the user. Although dynamically updating the PSN data in a rapid succession may seem like a feature since it provides the user with more information (such as song title and artist), some users may be distracted by such updates. These distractions become more of a problem when the user is an operator of an automobile. By updating the PSN data rapidly, the operator's attention may be diverted to the radio display, instead of remaining on the road on which the automobile is traveling.

Therefore, there is a need for a system and method of filtering PSN data so as to remove PSN data that may be distracting to the user.

BRIEF SUMMARY

In satisfying the above need, as well as overcoming the enumerated drawbacks and other limitations of the related art, the present invention provides a system and method for filtering PSN data. The system includes a processor, an antenna in communication with the processor, a display device in communication with the processor, and a memory unit in communication with the processor. The memory unit contains instructions executable by the processor to configure the processor to receive a signal having PSN data from a wireless source via the antenna, determine if the PSN data is a static PSN or a slowly updated PSN, and display the PSN data on the display device if the PSN data is a static PSN or a slowly updated PSN. If the PSN data is not static or slowly updated, the PSN data will not be displayed.

Further objects, features and advantages of this invention will become readily apparent to persons skilled in the art after a review of the following description, with reference to the drawings and claims that are appended to and form a part of this specification.

DETAILED DESCRIPTION

Figure 1:
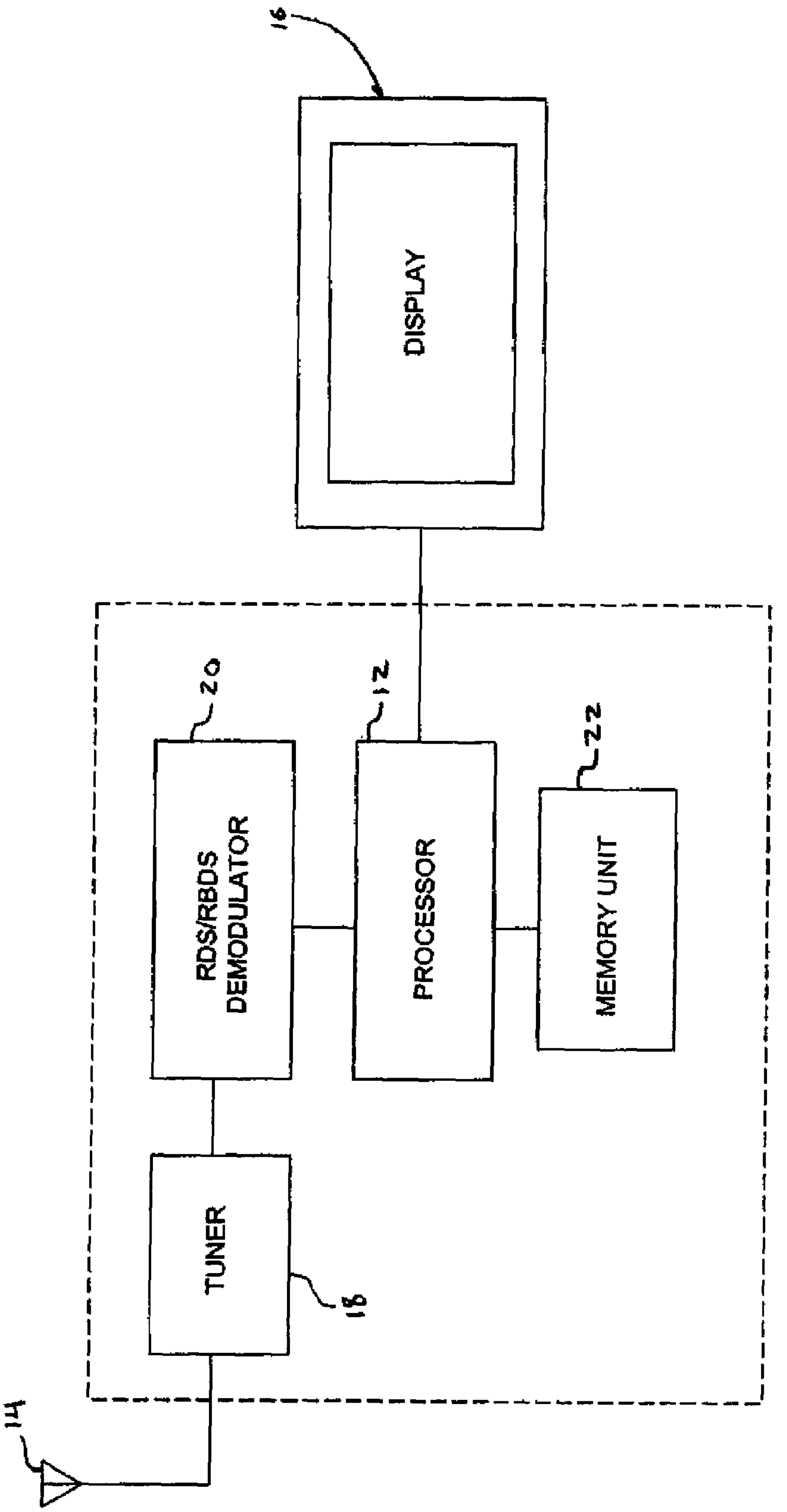
FIG. 1 is a block diagram of a system for filtering PSN data embodying the principles of the present invention.

Referring to FIG. 1, a system 10 for filtering PSN data is shown. The system 10 includes a processor 12 in communication with an antenna 14 and a memory unit 22. The memory unit 22 contains instructions executable by the processor 12. As will be explained in the paragraphs that follow, these instructions will configure the processor 12 to filter PSN data received by the antenna 14. A display device 16 is connected to the processor 12 of the system 10.

In this embodiment, the system 10 is a distributed system, wherein the display device 16 is separate from the system 10. However, it should be understood that the display device 16 may be integrated within the system 10. Generally, both the system 10 and the display device 16 are integrated within a cockpit of an automobile, however, the system 10 and display device 16 may also be integrated within an external receiver or combination audio/video device commonly used in a home or workplace.

The processor 12 communicates with the antenna 14 via a tuner 18 and a demodulator 20. The tuner 18 functions to tune the system 10 into a specific frequency of a wireless source, generally an FM radio station sending sub-carrier data. Thereafter, the demodulator 20 receives the radio frequency received by the tuner 18 and demodulates the signal. The demodulator 20 separates and digitizes the FM sub-carrier data before providing this data to the processor 12. As will be appreciated by those skilled in the art, demodulator 20 may be a Radio Data System ("RDS") demodulator, as commonly found in the European Union, or may be a Radio Broadcast Data System ("RBDS") demodulator, as commonly found in North America.

Figure 2:
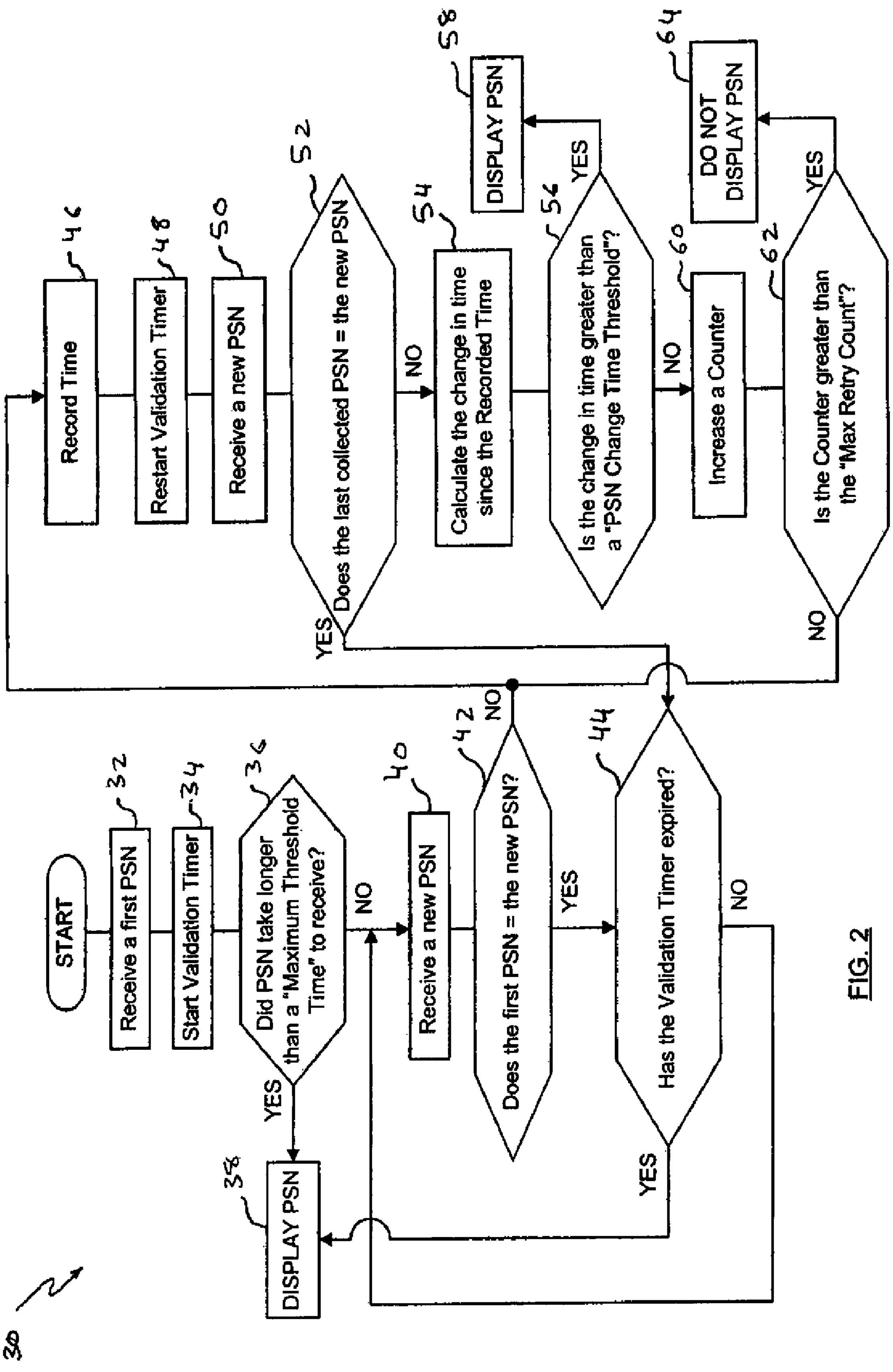
FIG. 2 is a block diagram of a method for filtering PSN data embodying the principles of the present invention.

The PSN data is filtered via a method 30 for filtering PSN data and contained within the instructions of the memory unit 22 is shown. Preferably, the method 30 executes every time a radio station is tuned in by the tuner 18. As shown in FIG. 2, the method 30 begins by first receiving a first PSN from the antenna 14 at step 32. Thereafter, in step 34, a validation timer is started. Generally, the validation timer is set for approximately six seconds but may be varied depending on the application as will be further explained below.

In step 36, a determination is made if receipt of the first PSN took longer than a maximum threshold time to receive. Generally, this maximum threshold time is about two and a half seconds. It has been discovered that when receipt of the first PSN takes longer than two and a half seconds to be received, the PSN is likely a static PSN that does not change over time. If the PSN takes longer than a maximum threshold time to receive, the processor 12 will display the PSN data on the display 16 as shown in step 38.

If the first PSN takes less than a maximum threshold time to receive, the processor 12 will then receive a new PSN from the antenna 14, as shown in step 40. Thereafter, the processor 12 will make a determination if the first PSN equals the new PSN, as shown in step 42. If the new PSN and the first PSN are the same, the method 30 continues to step 44 where a determination will be made if the validation timer has expired. Previously, in step 34, it was stated that the validation timer was set to approximately six seconds. It has been discovered that if the PSN data outputted by the wireless source stays the same for a period longer than six seconds, the wireless source is likely transmitting static PSN data. Thus, if the PSN data transmitted by the wireless source is the same after the validation timer expired, PSN data will be displayed as shown in step 38. If the validation timer has not yet expired, the method 30 returns to step 40.

Returning to step 42, if the first PSN does not equal the new PSN, it is likely that the wireless source is not transmitting a static PSN. In this situation, the processor 12 may simply decide not to display any PSN data. However, further steps may be taken to determine if the PSN data is a slowly updated PSN.

In order to accomplish this task, the method 30 continues to step 46, wherein a system time is recorded. The system time recording is generally taken from a system clock located within the processor 12. Thereafter, the validation timer is reset, as shown in step 48, and a new PSN is received, as shown in step 50.

As will be explained later, the recorded system time will be used to determine if the PSN data being transmitted by the wireless source is a slowly updated PSN. The validation timer is reset to determine if the PSN data stays the same over a certain period. Although it was previously determined in step 42 that the PSN data is likely dynamic, there is a possibility that the received PSN data was in error, resulting in differing PSN data. Therefore, the validation timer is reset and another determination is made in step 52 if the most recently collected PSN data is the same as the previously collected PSN data. If the most recently collected PSN data is the same as the previously collected PSN data, the method 30 will return to step 44, where a determination is made if the validation timer has expired and the method repeats itself as previously described. Otherwise, the method 30 continues to step 54, where the processor 12 calculates the change in time since receiving the new PSN in step 50 and the time recorded in step 46. In step 56, a determination is made if the change in time is greater than a PSN change time threshold (which is generally 6 seconds), the processor 12 will determine that the PSN data transmitted by the wireless source is a slowly updated PSN and will display the PSN data as shown in step 58. Otherwise, a counter is increased as shown in step 60.

The counter of step 60 is used as a way to filter out any false positive determinations that the wireless source is transmitting as slowly updated PSN. For example, PSN data transmitted by the wireless source may contain errors. These errors may give the appearance to the system 10 that the PSN data changed rapidly. However, if one were to validate the results two or even three times, any false positive errors could be eliminated. Therefore, in step 62, the counter is compared to a max retry count. If the counter is greater than the max retry count the system 10 can safely determine that the PSN data received from the wireless source is not a slowly updated PSN and will not display the PSN as shown in step 64. When a decision is made not to display the PSN data, the display 16 may display a series of blank characters, such as spaces or underscores.

If the max retry count has not been exceeded by the counter, the method 30 returns to step 46 and another determination is made in order to avoid any false positives. Generally, the max retry count is set to three, to force the method 30 to confirm three times that the PSN is a slowly updated PSN or a static PSN. Once a determination has been made that the PSN data should or should not be displayed, the processor 12 may store this determination in either the memory unit 22 in another storage device in communication with the processor 12 for later access.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

The invention claimed is:

1. A method for filtering program service name ("PSN") data, the method comprising the steps of:

receiving a signal from a wireless source, the signal having PSN data;

determining if the PSN data is a dynamic PSN, a static PSN or a slowly updated PSN; and not displaying the PSN data on a display of the device if the PSN data is a dynamic PSN and displaying the PSN data on a display device if the PSN data is a static PSN.

2. The method of claim 1, wherein the step of determining if the PSN data is a dynamic PSN, a static PSN or a slowly updated PSN further comprising the step of:

receiving a first PSN from the wireless source;

determining the amount of time needed to receive the first PSN from the wireless source; and not displaying the PSN data on a display of the device if the amount of time needed to receive the first PSN data from the wireless source was less than a threshold time and displaying the PSN data on the display device if the amount of time need to receive the first PSN from the wireless source is greater than the threshold time.

3. The method of claim 2, wherein the threshold time is about 2.5 seconds.

4. The method of claim 1, further comprising the steps of:

receiving a new PSN;

determining if the new PSN is the same as a previously collected PSN;

calculating the time difference between receiving the new PSN and the previously collected PSN if the new PSN is not the same as the previously collected PSN; and displaying the PSN data on the display device if the time difference between receiving the new PSN and the previously collected PSN is less than a PSN change time threshold.

5. The method of claim 4, wherein the PSN time change threshold is about 6 seconds.

6. The method of claim 4, wherein the calculating step is repeated to prevent a false positive error from occurring.

7. The method of claim 6, wherein the calculating step is repeated three times.

8. The method of claim 1, further comprising the step of displaying blank characters on the display device if the PSN data is not a static PSN or a slowly updated PSN.

9. The method of claim 8, wherein the blank characters are a plurality of spaces.

10. The method of claim 8, further comprising the step of storing the PSN data for later use.

11. A method for filtering program service name ("PSN") data, the method comprising the steps of:

receiving a signal from a wireless source, the signal having PSN data and being a first PSN;

determining if the first PSN is a static PSN by determining if the amount of time needed to receive the first PSN from the wireless source is greater than a threshold time;

displaying the PSN data on the display device if the amount of time need to receive the first PSN from the wireless source is greater than a threshold time determining if the first PSN is a slowly updated PSN by receiving a new PSN and determining if the new PSN is the same as the first PSN for a period exceeding a validation time; and displaying the PSN data on the display device if the new PSN is the same as the first PSN for a period exceeding a validation time.

12. The method of claim 11, wherein the validation time is about 6 seconds.

13. A system for filtering Program Service Name ("PSN") data, the system comprising:

a processor;

an antenna in communication with the processor;

a display device in communication with the processor; and a memory unit in communication with the processor, wherein the memory unit contains instructions executable by the processor to configure the processor to receive a signal having PSN data from a wireless source via the antenna, to determine if the PSN data is a dynamic PSN, a static PSN or a slowly updated PSN, and to not display the PSN data on the display device, if the PSN data is a dynamic PSN and to display the PSN data on the display device if the PSN data is a static PSN or a slowly updated PSN.

14. The system of claim 13, wherein the system is a distributed system.

15. The system of claim 13, wherein the system is installed in an automobile.

16. The system of claim 13, wherein the instructions further configure the processor to receive a first PSN from the wireless source, to determine the amount of time needed to receive the first PSN from the wireless source, and to not display the PSN data on the display device if the amount of time needed to receive the first PSN from the wireless source is less than a threshold time, and to display the PSN data on the display device if the amount of time needed to receive the first PSN from the wireless source is greater than the threshold time.

17. The system of claim 16, wherein the threshold time is about 2.5 seconds.

18. The system of claim 16, wherein the instruction further configure the processor to receive a new PSN message, determine if the new PSN message is the same as the first PSN, and display the PSN data on the display device if the new PSN message is the same as the first PSN message for a period exceeding a validation time.

19. The system of claim 18, wherein the validation time is about 6 seconds.

20. The system of claim 13, wherein the instructions further configure the processor to receive a new PSN, determine if the new PSN is the same as a previously collected PSN, calculate the time difference between receiving the new PSN and the previously collected PSN if the new PSN is not the same as the previously collected PSN, and display the PSN data on the display device if the time difference between receiving the new PSN and the previously collected PSN is less than a PSN change time threshold.

21. The system of claim 20, wherein the PSN time change threshold is about 6 seconds.

22. The system of claim 20, wherein the instructions further configure the processor to repeat calculating the time difference between receiving the new PSN and the previously collected PSN if the new PSN is not the same as the previously collected PSN to prevent a false positive error from occurring.

23. The system of claim 13, wherein the instructions configure the processor to display blank characters on the display device if the PSN data is not a static PSN or a slowly updated PSN.

24. The system of claim 23, wherein the blank characters are a plurality of spaces.

* * * * *